Nov. 12, 1940.    F. S. COOPER    2,221,671
GAS DIELECTRIC MEDIA
Filed July 9, 1938
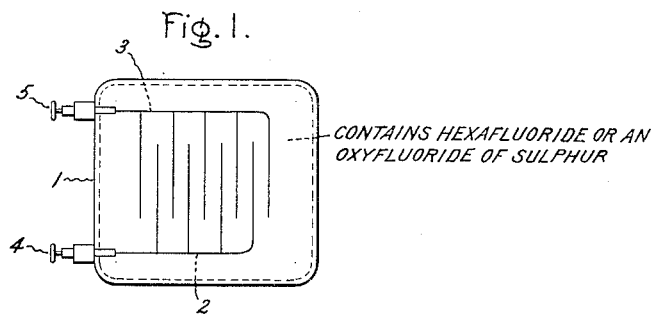
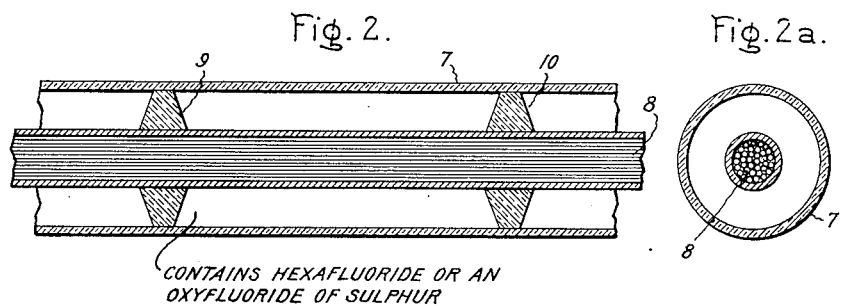
Inventor:
Franklin S. Cooper,
by Harry E. Dunham
His Attorney.

Patented Nov. 12, 1940

2,221,671

UNITED STATES PATENT OFFICE 2,221,671

GAS DIELECTRIC MEDIA

Franklin S. Cooper, Schenectady, N. Y., assignor to General Electric Company, a corporation of New York Application July 9, 1938, Serial No. 218,368

5 Claims. (Cl. 174—17)

The present invention relates to gaseous electric insulating and dielectric material and its object is to provide an insulating gas which is particularly adapted for use at superatmospheric pressures.

In my prior application, Serial No. 155,943, filed July 27, 1937, I have described and claimed electrically insulating gaseous media comprising fluorine compounds, and in particular aliphatic hydrocarbons containing fluorine, such, for example, as dichlorodifluoromethane. The present invention deals with improved electrical insulation including gas of the group consisting of the hexafluoride and the oxyfluorides of sulphur.

As explained in my prior application, it is desirable in some cases to obtain an enhancement of insulation by employing gases at high pressures. However, a limit is imposed on the permissible pressure by the liquefaction under pressure of gas insulation. For example, dichlordifluoromethane, which is a member of the group of fluorinated hydrocarbons, becomes liquefied even at ordinary temperatures when the pressure exceeds about 90 pounds per square inch. While considerable advantage may be obtained when high pressures are to be used, by the addition of an inert gas, such as nitrogen, to the fluorinated hydrocarbon gas, in some cases, particularly for insulation use in electrical devices in which the space factor is an important consideration, it is desirable to secure the desired resistance to electric breakdown without adding a fixed gas. Although some of the less condensable fluorinated hydrocarbons can be used at relatively high pressures, the gain in dielectric value obtained in such cases is not marked as such less condensable hydrocarbons have a lower dielectric value relative to air.

My present invention is based on the discovery that fluorinated sulphur compounds, such as the hexafluoride and the oxyfluorides of sulphur, possess properties suitable for electrical insulation, in particular high dielectric strength, as well as being compressible without liquefaction to pressures which are so high that such gases may be used with marked advantage over the fluorinated hydrocarbon group.

In the accompanying drawing are shown typical electric devices which are constructed to be dependent during normal operation on a compressed gas for the insulation of members charged at different potential. Fig. 1 represents diagrammatically a gas dielectric capacitor embodying my invention and Figs. 2 and 2a show a section of gas-insulated cable by longitudinal and cross-section.

The capacitor of Fig. 1 comprises a gas-tight receptacle 1 which may consist of metal or an insulating material, such as glass. It contains capacitor armatures or plates 2, 3 which are connected to the sealed-in terminals 4, 5. The dielectric medium separating the armatures is a fluorinated sulphur compound, such as sulphur hexafluoride ($SF_6$) or an oxyfluoride, including the mono-oxytetrafluoride ($SOF_4$) and the di-oxydifluoride or sulphuryl fluoride ($SO_2F_2$) used separately or in a mixture with one another. The sulphur hexafluoride is preferred because of its stability, low condensation temperature, namely about $-64°$ C. at atmospheric pressure, and its high dielectric strength, which is 2.4 times that of air under comparable conditions. The gaseous filling may be compressed to pressures as high as 25 to 40 atmospheres although lower pressures in some cases are advantageous.

In Fig. 2 is shown a gas-filled cable to which my invention is applicable. It comprises a gas-tight sheath 7, which may be metal, and a conductor core 8 which are held in spaced relation by insulators, two of which are indicated at 9 and 10. The cable members, being of well understood construction, are only conventionally indicated. The space between the core and sheath is charged with the gaseous hexafluoride or oxyfluoride of sulphur in a highly compressed state. The advantages of my invention are not limited to the electrical devices illustrated but also may be obtained in other electrical devices, such as transformers, switches, X-ray tube housings, bushings and the like.

What I claim as new and desire to secure by Letters Patent of the United States is:

1. An electric apparatus comprising the combination of a closed container, a compressed gaseous insulating medium therein, said medium having as a principal and essential ingredient gas of the group consisting of hexafluoride and oxyfluoride of sulphur, and an electric device in said container, said device being constructed to be dependent during normal operation on said gaseous medium for the insulation of members charged at different potentials.

2. An electric apparatus comprising the combination of a closed container, a compressed gaseous insulating medium therein comprising as principal and essential ingredient sulphur hexafluoride, and an electric device in said container, said device being constructed to be dependent during normal operation on said gaseous medium for the insulation of members charged at different potentials.

3. An electric apparatus comprising the combination of a closed container, a gaseous insulating medium therein, said medium consisting mainly of sulphur hexafluoride at a pressure of 25 to 40 atmospheres, and an electric device in said container, said device being constructed to be dependent during normal operation on said gaseous medium for the insulation of members charged at different potentials.

4. The method of insulating spaced electric elements normally subject to differences of electric potential which consists in filling the space between said elements with a gas chosen from the group consisting of hexafluoride and oxyfluorides of sulphur and maintaining said gas under superatmospheric pressure, thereby establishing a resistance to electric breakdown which is superior to the breakdown strength of air under comparable conditions.

5. The method of insulating spaced electric elements normally subject to differences of electric potential which consists in filling the space between said elements with sulphur hexafluoride gas and maintaining said gas under a pressure exceeding atmospheric pressure and up to forty atmospheres.

FRANKLIN S. COOPER.